3,544,556
**PROCESS FOR THE PREPARATION OF
CELLULOSE ETHERS**
Franz Eichenseer and Siegfried Janocha, Wiesbaden-Schierstein, and Hans Macholdt, Wiesbaden-Biebrich, Germany, assignors to Kalle Aktiengesellschaft, Wiesbaden-Biebrich, Germany, a corporation of Germany
Continuation of application Ser. No. 604,896, Dec. 27, 1966. This application Oct. 11, 1968, Ser. No. 768,965
Claims priority, application Germany, Dec. 30, 1965, 1,543,136
Int. Cl. C08b *11/00*
U.S. Cl. 260—231  7 Claims

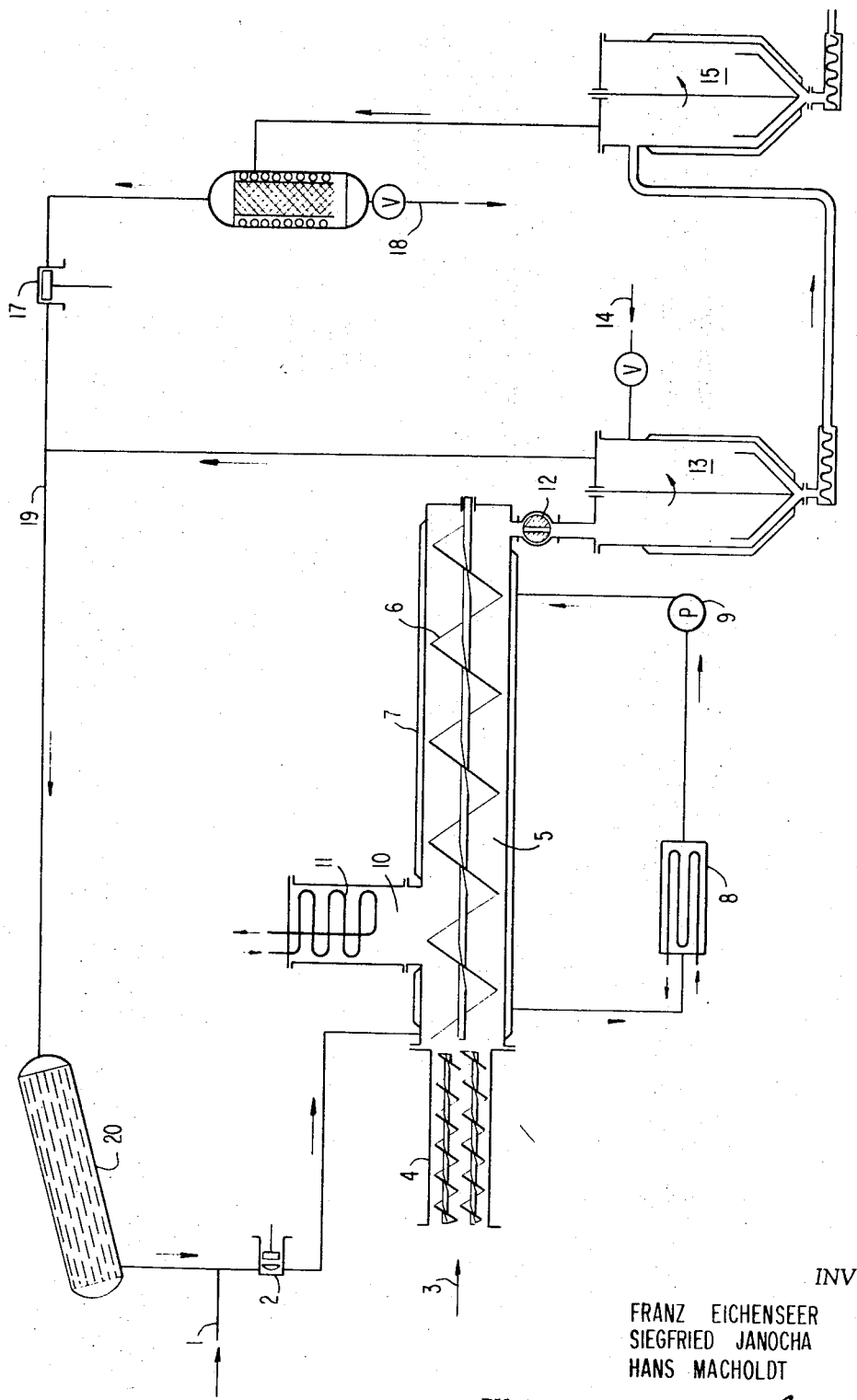

ABSTRACT OF THE DISCLOSURE

This invention relates to a process which comprises continuously passing a mixture of alkali cellulose, excess liquid methyl chloride, and liquid dimethyl ether through a reaction zone at a temperature in the range of about 70 to 95° C., and separating a cellulose ether from the reaction mixture.

---

This is a continuation of application Ser. No. 604,896 filed Dec. 27, 1966.

This invention relates to a process for the continuous production of methyl cellulose and methyl hydroxyalkyl cellulose, preferably methyl hydroxyethyl cellulose and methyl hydroxypropyl cellulose, by reacting alkali cellulose with an excess of liquid methyl chloride or with a mixture of liquid methyl chloride and an alkylene oxide, such as ethylene oxide or propylene oxide.

It is known to prepare methyl cellulose and the aforementioned mixed ethers by batchwise reacting alkali cellulose and a liquid etherifying agent in a reaction vessel. The known process is advantageously operated with an excess of etherifying agents, the quantity thereof usually being at least five times the weight of the air-dry cellulose employed. It is advisable to use as little a quantity of liquid methyl chloride as possible in order to evaporate and liquefy as little as possible thereof. Generally, etherifying agents in not more than 20 times the weight of air-dry cellulose are employed. In reactions on an industrial scale under the described conditions, reaction times of two to three hours are usually employed, followed by a heating time of about one hour.

In order to achieve a more rapid rate of reaction, various efforts have been made. It has been tried, for example, to carry out the reaction at higher temperatures and it has been found that, at temperatures above 100° C., the reaction proceeds more rapidly but products of inferior quality are obtained. Better results are achieved by intensive stirring but, even with such measures, the reaction times do not decrease below two hours.

Furthermore, it is known to cause liquid methyl chloride to flow through stationary alkali cellulose in a discontinuous process. It is also known to perform the reaction between alkali cellulose and methyl chloride in the presence of an inert diluent in which methyl chloride is soluble; a suitable known diluent is dimethyl ether. A reaction time below two hours, however, cannot be achieved with this process, either.

A substantial acceleration of the rate of etherification together with the possibility of a continuous operation is provided by employing screw presses. By means of rolling friction therein, the reactants are intensively mixed, which results in increasing the reaction rate. This process is very advantageously applied in the reaction of alkali cellulose with solid etherifying agents, such as with monochloroacetate. The preparation of methyl cellulose by etherifying alkali cellulose with an excess of liquid methyl chloride in screw presses alone is less recommended, since sealing thereof at the necessary reaction temperatures, owing to the low boiling point of methyl chloride, requires considerable expenditures and regulation of the temperature is difficult.

As has already been stated, it is known to prepare methyl hydroxyalkyl cellulose by the simultaneous action of methyl chloride and alkylene oxide. Operation is performed in two steps: oxalkylation preferably takes place at a low temperature, and methylation at an increased temperature. These processes, too, when carried out according to the known methods, proceed slowly.

The present invention provides a process for the preparation of methyl cellulose and methyl hydroxyalkyl cellulose, such as methyl hydroxyethyl cellulose and methyl hydroxypropyl cellulose, which operates with shorter reaction times and thus permits higher through-puts.

Preliminary trials carried out for the purpose of orientation have shown that etherification itself can proceed substantially more rapidly than it has in the known reactions performed on an industrial scale. It was found that diffusion of the reactants as well as the temperature determine the speed of the reaction. It is clear that, in a properly performed reaction, substantially higher through-puts can be achieved than have been achieved in the known processes.

In the process of the invention, the reactants, i.e. alkali cellulose, liquid methyl chloride, alkylene oxide if desired, preferably liquid ethylene oxide or liquid propylene oxide, and liquid dimethyl ether are continuously introduced into a reaction tube and, immediately upon introduction into the reaction tube, are heated to a temperature between 70 and 95° C. Such a temperature is maintained until the end of the reaction, the reaction mixture then is continuously discharged, and the cellulose ether is isolated. That embodiment of the process is preferred in which the weight of the etherifying liquid constituents is 5 to 10 times the weight of the dry cellulose contained in the alkali cellulose and in which the reactants are passed in the same direction through a reaction tube which is provided with a screw conveyer and connected with a heat exchanger. The heat exchange medium flows in countercurrent to the reaction mixture, in order to heat the reaction mixture to the reaction temperature and, along the entire length of the tube, to maintain it at a substantially constant temperature in the range of 70 to 95° C. The reaction tube is further provided with a steam dome in which, for removing the reaction heat, gaseous methyl chloride is condensed by means of a reflux cooler. In the preferred embodiment of the process, the reaction mixture is discharged at the end of the reaction tube after a reaction time of 15 to 60 minutes, suspended with pressure release, also in the same direction, in water of 75 to 95° C. and washed out. Furthermore, the previously liquid constituents escaping as gases during suspension are condensed and returned, the dimethyl ether being returned only to an extent such that, in the flowing reaction mixture in the reaction tube, a substantially constant content of dimethyl ether is maintained. The adjusted content is between 2 and 30 percent by weight, based on the weight of methyl chloride. The prepared cellulose ether is separated in known manner from the hot water in which it is dispersed. Methyl hydroxyethyl cellulose or methyl hydroxypropyl cellulose preferably is prepared in this manner.

The process of the present invention provides high-quality products, i.e. since there is little degradation of the alkali cellulose as a result of the careful reaction conditions, the products of the process have a high molecular weight and a correspondingly high viscosity in aqueous solution.

Concerning oxalkylation, it has been found that, for reaction with a mixture of the liquid constituents compared to the hitherto known processes, an increased temperature, about at the upper limit of the indicated range, is advantageous. By diluting alkylene oxide with methyl chloride, homopolymerization is minimized even at higher temperatures. The advantage of the higher temperatures is that oxalkylation and methylation take place at the same temperature whereas otherwise they occur in separate temperature ranges.

As a result of the continuous performance of the reaction, methylation and oxalkylation proceed more rapidly. This effect is achieved, in the first place, by heat conduction. The heating time of the reaction constituents introduced in the cold state into the reaction tube is only about 2 minutes, which is substantially shorter than it ever could be in a vessel. This results from the spatial separation of the intensively reacting reaction mixture and more or less reacted mixture as well as from the fact that in the main reaction zone there is provided sufficient liquid methyl chloride which acts as a heat carrier. Simultaneously, the reaction temperature can be maintained at the upper permissible limit without any danger of a vigorous and uncontrollable reaction. Furthermore, thorough mixing in the screw press contributes to increasing the reaction velocity.

Furthermore, it has been found advantageous, in addition to the conditions already stated, to fulfill other selected process conditions in order to obtain products of high quality.

It is thus advantageous to use alkali cellulose having a cellulose content of 20 to 35 percent by weight and 25 to 40 percent by weight of sodium hydroxide. It may be produced according to a known process, e.g. by immersing and pulping cellulose in sodium hydroxide solution. The sodium hydroxide solution should contain 30 to 50 percent by weight of sodium hydroxide and have a temperature in the range of 10 to 50° C. It also is possible to prepare alkali cellulose by mixing cellulose powder with alkali liquor. Very good results also are obtained when employing an alkali cellulose prepared by mixing and reacting cellulose with sodium hydroxide solution in a double screw press as described in copending application Ser. No. 547,659, filed May 4, 1966 now abandoned.

Dimethyl ether is added to the methyl chloride. Departing from the known batchwise process in which dimethyl ether also is used, in the process of the present invention the dimethyl ether need not be added at the beginning but it is sufficient to recycle a part of the dimethyl ether which is formed in a side reaction from the methyl chloride.

The concentration of the alkylene oxides required for the preparation of the mixed ethers may vary within wide limits and is adjusted in dependence upon the desired degree of substitution. When using ethylene oxide it is possible, for example, to employ 0.001 to 0.1 part by weight per part by weight of methyl chloride. Cellulose ethers having methoxy values of 20 to 32 percent and hydroxyalkyl values of 0.2 to 8 percent are obtained. Other mixing ratios also are possible and cellulose ethers beyond this substitution range also can be prepared. When using propylene oxide, quantities of 0.001 to 0.15 part by weight per part by weight of methyl chloride preferably are employed. Similar quantities are used with butylene oxide.

The reaction time may be within wide limits. Generally, brief reaction times are preferred, but for better utilization of the alkylene oxides, particularly propylene oxide, somewhat longer reaction times are advantageous. A reaction time of about 45 minutes has been found advantageous in most cases.

The invention will be further illustrated in the accompanying flow diagram of the process.

Liquid methyl chloride and, if desired, liquid ethylene oxide and/or propylene oxide are pumped into the reaction tube 5 via the feed line 1 by means of the hydrostatic pressure pump 2. The pump 2 simultaneously serves for regulating the quantity of liquid, which is so determined that it can operate against the pressure prevailing in the reaction tube.

The alkali cellulose 3 is fed into the inlet of the double screw press 4 which forces the friable material into the reaction tube 5; the double screw press simultaneously serves for sealing. Using such screw presses for conveying alkali cellulose is disclosed in the copending application, supra.

The reaction constituents are advanced in the reaction tube 5 by means of the screw 6. A heating jacket 7 surrounding the reaction tube serves for heating. The temperature of the heat-exchange liquid is regulated in the separate heat exchanger 8. For increasing the rate of exchange, the liquid is recycled by means of the pump 9. The reaction can be maintained in a thermally stable state without exterior heat input.

In the feed end, the temperature in the reaction tube necessarily is somewhat lower than that provided by the heat exchanger. But in the adjacent reaction zone, the reaction mixture reaches the desired temperature very rapidly and will remain constant to the end of the tube. The temperature easily can be maintained constant since, by means of the reflux cooler 11 in the steam dome 10, heat is continuously withdrawn from the system.

Since, in dependence upon the reaction conditions, a pressure between 18 and 29 atmospheres gauge prevails in the reaction tube, discharge of the reaction mixture in the form of a thick suspension is performed with a suitable pressure-maintaining device 12. Commercial rotary pumps may be employed as well as the devices disclosed in copending application Ser. No. 554,848, filed June 2, 1966 now Patent No. 3,401,848, and in U.S. Patent No. 3,278,-092. The discharged material consisting now of cellulose ether, an excess of etherifying agent, dimethyl ether, alkali halide, and by-products passes from the valve 12 into the vessel 13 being provided with an agitator.

Simultaneously, hot water 14 continuously flows into the vessel 13 and is intensively mixed with the reaction product therein. Sufficient washing out of the cellulose ether in one operation, in order to remove the adhering alkali halide, is effected if 10 to 25 parts by volume of hot water are employed per part by volume of reaction product. The mixture of water, etherifying agents, methanol, and cellulose ethers is continuously conveyed from the vessel 13 to the vessel 15 provided with an agitator and the pressure is further released therein. In a centrifuge, not shown, the suspension is separated into liquid and dry portions.

The still moist cellulose ether then is worked up and dried in the usual manner. When contacting the hot water, the highly volatile constituents flowing into the evaporation vessel 13 together with the cellulose ether escape as gases. Residues of etherifying agent evaporating from the vessel 15 are condensed by the compressor 17 and, through the line 19, are returned to the feed. Undesired by-products are withdrawn from the system by means of the separator and the discharge line 18. The recycled gas is liquefied in the cooler 20 and, as stated above, so determined in its quantity that in the reaction tube, a content of dimethyl ether between 2 and 30 percent by weight, calculated on the quantity of methyl chloride, is obtained.

TABLE 1

| | Heating time, minutes | Reaction time, minutes | Reaction temperature, °C. | Initial average degree of polymerization of cellulose, Cuen | Residue, percent in 2% aqueous solution at 20° C. | Viscosity, in cp., 2% aqueous solution at 20° C. | OCH3 content, percent | Hydroxyalkyl content, percent |
|---|---|---|---|---|---|---|---|---|
| Discontinuous conventional process | 60 | 120 | 60/75 | 1,200 | 7 | 4,000 | 30 | |
| Continuous methylation according to Example 1 | ~2-3 | 22 | 85 | 1,200 | 3 | 12,000 | 30 | |
| Continuous mixed etherification with ethylene oxide according to Example 2 | ~3 | 27 | 80 | 1,200 | <0.5 | 20,000 | 26 | 3 |
| Continuous mixed etherification with propylene oxide according to Example 3 | ~3 | 37 | 80 | 500 | <0.5 | 1,000 | 26 | 3 |

EXAMPLE 1

Pine cellulose of 1200 average degree of polymerization, measured in Cuen, is ground to a powder. The cellulose powder then is mixed in a commercial continuous mixer, with water cooling, with a 48 percent sodium hydroxide solution at room temperature, so that an alkali cellulose of the following composition is obtained: 31 percent NaOH, 33 percent cellulose, and 36 percent water. This alkali cellulose is homogenized in a screw press and introduced into a reaction tube. Simultaneously, 6 times the quantity, calculated on the dry weight of cellulose, of liquid methyl chloride having a temperature of 25° C. is pumped in. The reaction takes place at 85° C. and at a pressure of 25 atmospheres gauge. The finished product with the excess of methyl chloride and the by-products is introduced into an evaporator after a reaction time of 25 minutes. Separation of solid and liquid by-products as well as separation of the volatile substances is effected at a suspension temperature of 75° C., in the manner described above. The gas contains 93 percent methyl chloride, 5.5 percent dimethyl ether, and 1.5 percent of water and methanol. This gas is liquefied and reacted methyl chloride is replenished. The properties of a thus prepared methyl cellulose are given in Table 1 below.

EXAMPLE 2

Alkali cellulose with a content of 26 percent NaOH, 32 percent cellulose, and 42 percent water is prepared as described in Example 1 above and introduced in the same manner into the reaction tube. The difference from the prior example is that the introduced methyl chloride contains three percent of ethylene oxide. The reaction temperature is 80° C. and the reaction time in the reaction tube is adjusted to 30 minutes. Working up is effected as in Example 1, except that the temperature of the suspension is increased to 85° C. Unreacted ethylene oxide is liquefied, together with the methyl chloride and the by-products thereof, and, after replenishing the reacted etherifying agents, is introduced again into the reaction. The properties of this mixed ether also are listed in Table 1 below.

EXAMPLE 3

Pulped alkali cellulose from beech cellulose of 500 average degree of polymerization, measured in Cuen, having the same composition as in Example 2 above, was introduced into the reaction tube by means of a screw press. Together with the methyl chloride, 5 percent of propylene oxide, calculated on the methyl chloride, are fed into the reaction tube. The throughput is so adjusted that, after 40 minutes at a reaction temperature of 80° C., the finished product is discharged. Working up and recovering the excess etherifying agents is effected as described in Example 2 above.

As is shown in the table, according to the continuous process of the present invention, not only higher throughputs can be achieved but also qualitatively better products are obtained than with the known discontinuously operating process.

It will be obvious to those skilled in the art that many modifications may be made within the scope of the present invention without departing from the spirit thereof, and the invention includes all such modifications.

What is claimed is:

1. A process which comprises continuously passing a reaction mixture of alkali cellulose, excess liquid methyl chloride, and liquid dimethyl ether through a reaction zone at a substantially constant temperature in the range of about 70 to 95° C., separating a cellulose ether and a portion of the dimethyl ether from the reaction mixture passed through the reaction zone, recycling the fluid remainder of the reaction mixture to said reaction zone, and adding alkali cellulose and additional methyl chloride to said recycled remainder, the separation of dimethyl ether maintaining the content of the dimethyl ether in said reaction zone between 2 to 30 percent by weight of the methyl chloride contained therein.

2. A process according to claim 1 in which the mixture passed through the reaction zone includes a liquid alkylene oxide.

3. A process according to claim 1 in which the weight of the etherifying liquid constituents is 5 to 10 times the weight of dry cellulose contained in the alkali cellulose.

4. A process according to claim 1 in which the alkali cellulose has a cellulose content of 20 to 35 percent by weight and a 25 to 40 percent by weight content of sodium hydroxide.

5. A process according to claim 1 in which in separating the cellulose ether from the reaction mixture, the cellulose ether is washed out with 10 to 25 parts by volume of water per part by volume of reaction mixture.

6. A process according to claim 2 in which 0.001 to 0.1 part by weight of ethylene oxide is employed per part by weight of methyl chloride.

7. A process according to claim 2 in which 0.001 to 0.15 part by weight of propylene oxide is employed per part by weight of methyl chloride.

References Cited

UNITED STATES PATENTS 2,610,180  9/1952  Klug _____ 260—231
2,644,818  7/1953  Downing et al. _____ 260—231

DONALD E. CZAJA, Primary Examiner

M. I. MARQUIS, Assistant Examiner

U.S. Cl. X.R.

260—232